United States Patent
Arrouye et al.

(10) Patent No.: US 6,230,310 B1
(45) Date of Patent: May 8, 2001

(54) METHOD AND SYSTEM FOR TRANSPARENTLY TRANSFORMING OBJECTS FOR APPLICATION PROGRAMS

(75) Inventors: Yan Arrouye, Cupertino; Sean J. Findley, Gilroy; Keith L. Mortensen, Sunnyvale, all of CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/161,758

(22) Filed: Sep. 29, 1998

(51) Int. Cl.[7] .................................................. G06F 9/45
(52) U.S. Cl. ............................ 717/1; 709/320; 709/328
(58) Field of Search .......................... 717/1, 11; 709/320, 709/328

(56) References Cited

U.S. PATENT DOCUMENTS

| | | | |
|---|---|---|---|
| 5,537,592 | * 7/1996 | King et al. | 395/600 |
| 5,564,017 | * 10/1996 | Corn et al. | 395/200.01 |
| 5,586,317 | * 12/1996 | Smith | 395/683 |
| 5,652,876 | 7/1997 | Ashe et al. | |
| 5,758,153 | * 5/1998 | Atsatt et al. | 395/614 |
| 5,964,843 | * 10/1999 | Eisler et al. | 709/300 |
| 6,000,028 | * 12/1999 | Chernoff et al. | 712/226 |
| 6,076,141 | * 6/2000 | Tremblay et al. | 711/108 |

\* cited by examiner

*Primary Examiner*—Kakali Chaki
*Assistant Examiner*—Wei Zhen
(74) *Attorney, Agent, or Firm*—Burns, Doane, Swecker & Mathis, L.L.P.

(57) ABSTRACT

A software object management system incorporated in a computer operating system utilizes a suite of transformations to convert objects between software object formats not native to an application program, and those which are a native software object type. In addition to formatting, transformations are also applied to change the location of an object and authenticate the object. With this approach, applications programs need not have the ability to handle any type of object other than their native types. The operating system does the transformations in a manner that is transparent to the application program. Additional transformations can be added to the operating system without modifying the application programs.

21 Claims, 2 Drawing Sheets

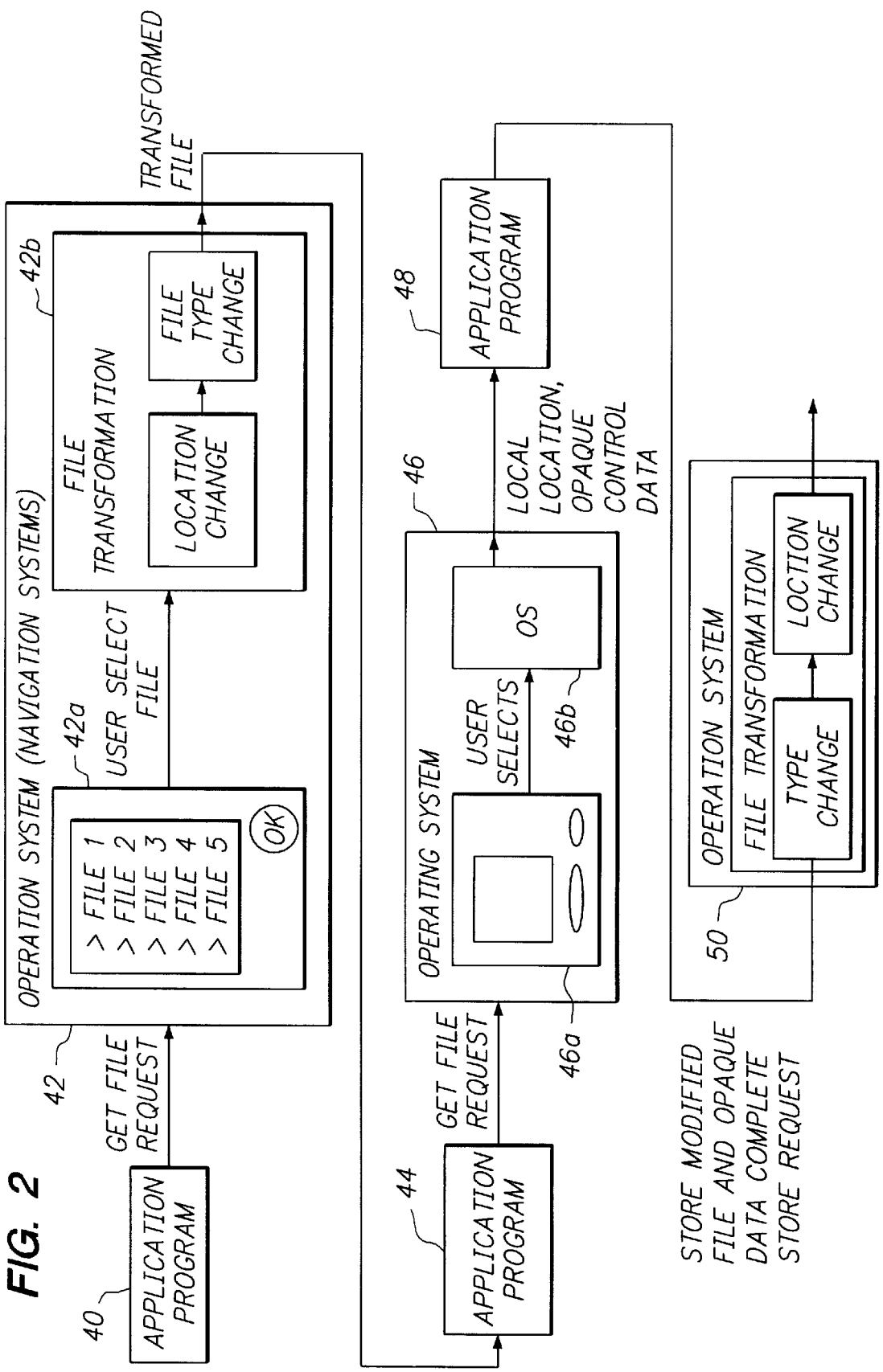

METHOD AND SYSTEM FOR TRANSPARENTLY TRANSFORMING OBJECTS FOR APPLICATION PROGRAMS

RELATED APPLICATIONS

This application is related to the applications, Arrouye et al, U.S. patent application Ser. No. 09/162,125 for, "A MULTI-REPOSITORY DISPLAY SYSTEM USING SEPARATE PRESENTATION, ADAPTATION AND ACCESS LAYERS," Arrouye et al, U.S. patent application Ser. No. 09/162,126 for, "PERSISTENT STATE DATABASE FOR OPERATING SYSTEM SERVICES", and Arrouye et al, U.S. patent application Ser. No. 09/162,625 for "METHOD AND APPARATUS FOR "JUST-IN-TIME" DYNAMIC LOADING AND UNLOADING OF COMPUTER SOFTWARE LIBRARIES", which are all incorporated herein by reference.

BACKGROUND OF THE INVENTION

1. Field of the Invention

The present invention relates to a software object management system for computers, and more particularly to a system which selectively performs various transformations to objects in a manner which is transparent to application programs which handle the objects. These transformations include, but are not limited to, changes in format, changes in storage location, and authentication.

2. State of the Art

When an application program performs operations upon a file, typically the file must be in a format which is native to that application. For example, a text editor may be only designed to handle plain text files, and therefore would not recognize special codes and the like which may be present if the file is in the format of a word processing application or a database. When a user selects a command to open a file, the text editor issues a call to a computer file system to list the files which are available to be opened. As part of this call, the application program may inform the operating system of the type of files it is capable of handling, e.g. "text" files. In response, the file system only returns information about that particular type of file. In this case, therefore, the usere's selection of files to be opened is limited to files of the identified type.

To overcome these types of limitations, many application programs are provided with built-in, or plug-in, conversion facilities. For instance, a word processing program may have a converter, or translator, for converting files in the format of another word processing program into its native format. In this situation, when the word processing program issues a call to open a file, it may inform the file system of not only its own native format, but also the format of any other type of file for which it has a translator. In response, the file system returns a list of files which are in the native format of the word processing program, as well as files which can be translated into that format by the program.

In addition to the limitations associated with file formats, similar concerns apply to the sites from which an application program can retrieve files, or to which it can store them. Many programs can only communicate with a local file system, and are not capable of accessing files at remote sites, for example those stored on an FTP file server. Typically, files are stored at such sites in a compressed form. Therefore, in order to retrieve a file from such a site, the application program must be capable of communicating with the FTP server to download the file, decompress it, and then translate it into its native format.

Another type of transformation which may have to be carried out pertains to the field of authentication. To limit unauthorized access and/or inhibit modification, documents may be encrypted with a password or encoded with a digital signature. Before an application can process such objects, they have to be decrypted and/or have their digital signatures verified.

The foregoing examples are merely illustrative of the types of transformations which must be performed on an object before it is in a state where it can be handled by a given application program. As the number of application programs with individual native formats continues to grow, it can be seen that the number of different conversion facilities which these programs must include will also have to increase, if they are to be compatible with one another. Similarly, as more types of file storage facilities become available, each with its own access protocol and/or encoding scheme, and more security measures are employed to control access and modification of objects, additional functionality must be built into the programs. At some point, it becomes impractical to add further translators and conversion facilities to an application program, as a result of which its file access and storage capabilities are limited.

It is desirable, therefore, to provide a mechanism via which application programs can be provided with access to files of a variety of different types, without requiring each program to include conversion facilities for each of the different types of files and each of the different sites from which such access is desired. Doing so enables the application programs to be streamlined so that they need only be able to operate on files of in a native state, without having to perform all of the various types of transformations that may be necessary to convert the file to and from that state.

SUMMARY OF THE PRESENT INVENTION

The present invention generally relates to a method and system in which objects to be handled by an application program, such as files, are transformed into an appropriate state by the computer's operating system, rather than the application program. In the context of the invention, the "state" of an object refers to a variety of conditions, including its format, location, authentication, and the like. Such an approach provides significant flexibility, since new transformations to convert from one state to another can be added by expanding the operating system without requiring the application programs to be modified.

In one embodiment, the operating system uses opaque control data to indicate appropriate transformations. A user selects desired file types and/or storage sites for access, for example from a user interface. In response, the operating system determines all of the transformations that need to be performed for the files. The operating system encodes the transformation information as opaque control data. This opaque control data can be stored with the object at a local location. This control data is "opaque" in the sense that it need not be interpreted by the application program. Later, the opaque control data is interpreted by the operating system to control the transformation of the object.

In one embodiment, application programs use standardized calls to the operating system. A "get file" call may cause the operating system to display a user interface showing the objects for selection by a user for the application program. Objects which are transformable under the control of the operating system from a state which is not native to the application program to a state that is native to the application program can be shown in the visual display. When the user selects a software object of the non-native but transformable type, the operating system calls all necessary transformation routines to transform the selected object into a transformed object which is supplied to the application program. These transformations change the state of the object from one that is not native to the application program to one that is native to the application program.

A "put file" call may result in another type of user interface being displayed. The operating system detects user input to this user interface to determine what transformations are required to retransform the modified object back into the original state, or into another selected state. The operating system then supplies a local location for storing the modified object and supplies the opaque control data to the application program. The application program stores the modified object and the control data at the local location. The application program then produces a "complete store" call, indicating that the object and opaque control data has been stored in the local location. The operating system then accesses the modified object with the opaque control data at the local location and uses the opaque control data to control the transformation and storage of the modified object into the selected location and type.

A benefit of the present invention is that the operating system can add additional transformations as new file types, storage facilities, etc. become available, without requiring changes to application programs.

BRIEF DESCRIPTION OF THE DRAWINGS

The present invention may be further understood from the following description in conjunction with the appended drawings. In the drawings:

FIG. 2 is a diagram illustrating the operation of one embodiment of the present invention.

DETAILED DESCRIPTION OF THE PREFERRED EMBODIMENTS

Figure 1:
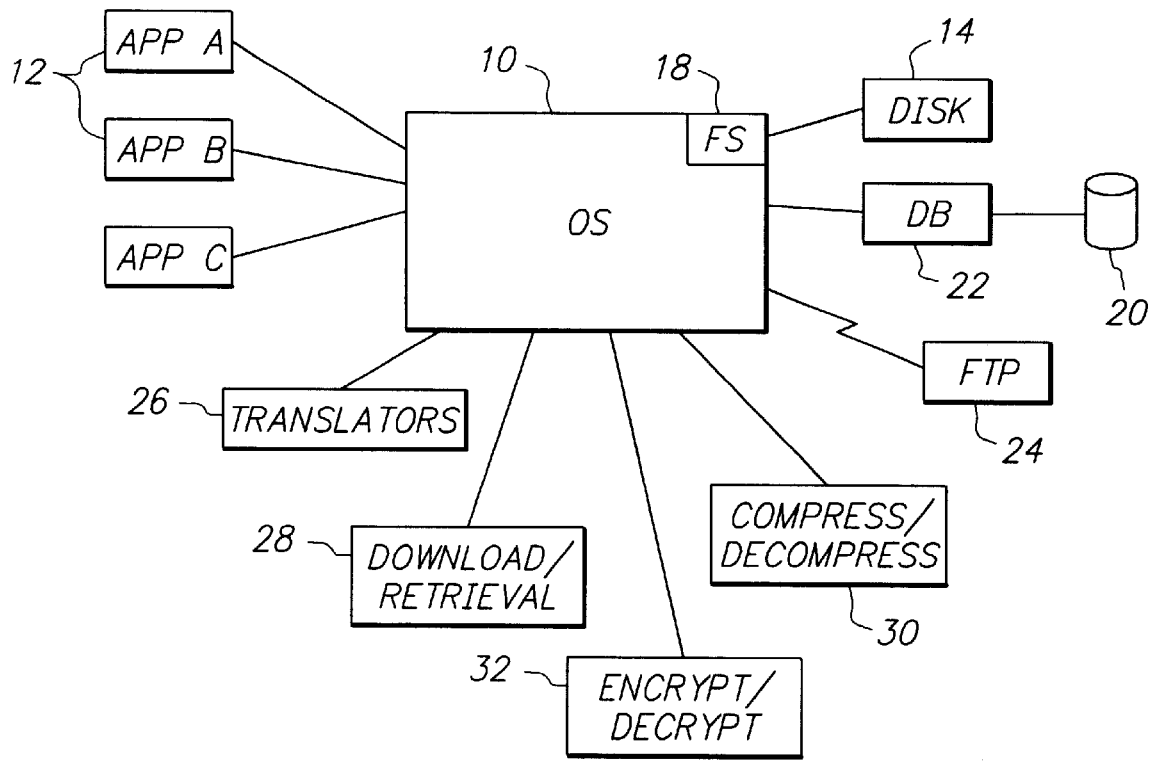
FIG. 1 is a block diagram of the architecture of a computer system in accordance with the present invention.

A general block diagram of a computer system which incorporates the principles of the present invention is illustrated in FIG. 1. As is conventional, the computer system includes an operating system 10 which handles the basic operations of the computer, and one or more application programs 12 which are designed to perform specific types of tasks through the creation and editing of objects, such as files. These files can be stored at a variety of different sites. Typically, files which are handled on a frequent basis might be stored on a local disk drive 14 or other non-volatile storage medium. Access to these files is provided through a file system 18 which is part of the computer's operating system 10. Other files might be located on a database server 20, in which case they are retrieved and stored by means of a suitable database program 22. Still other files might be stored at a remote site on an FTP server 24, or the like.

Each of the application programs 12 is designed to handle a specific type of object which is native to that application. For instance, one program, APP A, may be a simple text editor which operates upon plain text files, whereas another program, APP B, may be a more sophisticated word processing program that generates files in a rich text format. Another one of the programs, APP C, could be a spreadsheet program which handles files of a third type. Each of these three types of files can be stored on the local storage system 14, along with files of other types which are associated with additional application programs. The application programs have the ability to communicate with the file system 18, to store files in their native formats on the local storage system 14 and retrieve files therefrom.

While each of the application programs can process files of its native type, they are not inherently capable of handling files of other types which may be associated with different application programs. To process these other types of files, they must be translated into the native format of the application program which is to handle them. To this end, various translators 26 are provided in the computer system. Each translator has the ability to translate a file from one format to another format. In accordance with one aspect of the present invention, the translators are associated with the computer's operating system 10, rather than the individual application programs 12. In addition to translators for converting between the native file formats of the various application programs 12, the operating system can also include translators for converting between the format for files stored on the database server 20 and the native file formats of the application programs.

While each of the application programs 12 may have the ability to communicate with the file system 18 to access files on the local disk drive 14, they may not be able to communicate with the database program 22 to access files on the server 20. Similarly, they may not have the capability to download files from the FTP server 24. To accommodate these different forms of storage sites, the operating system 10 has another set of transformation programs 28 which handle the retrieval and/or downloading of objects from these sites. For example, one of these programs contains all of the protocols which are necessary to communicate with and transfer files to and from the FTP site 24. Another programs is capable of issuing queries and/or commands to retrieve and store files and records via the database program 22.

Quite often, files which are stored at a remote site such as the FTP server 24 are compressed, to reduce storage requirements as well as decrease transmission times. In addition, they may password be encrypted or encoded with a digital signature, for security purposes. When they are downloaded to the user's computer, they must be decompressed and decrypted or decoded before the application programs 12 can process them. However, the programs 12 themselves may not possess the necessary functionality to carry out these processes, particularly where a variety of different types of compression and encryption techniques are likely to be encountered. To this end, the operating system 10 is provided with other sets of transformation modules 30 and 32 which perform these functions.

The operating system 10, as well as each of the transformation modules 26–32, are stored on a suitable computer-readable medium, and loaded into the computer's working memory for execution. For example, they can be stored locally on the hard disk drive 14. Alternatively, in a network computing environment, they might be stored on a network server and downloaded to the network computer upon startup of the computer.

In the operation of the computer system, objects such as files are transferred between the application programs 12 and the various storage facilities 14, 20 and 24. For any given transfer between a particular application program 12 having an associated native file format and one of the storage sites, the state of the object being transferred may need to be changed to accommodate the capabilities of the application program. In accordance with the present invention, the operating system 10 determines a suite of transformations that apply to that transfer. For instance, if a text editor issues a request to retrieve a particular file from the FTP site 24, the following transformations need to be carried out:

1. Download the file from the site
2. Decompress the file
3. Decrypt the file from encoding associated with FTP transfers to binary encoding
4. Translate from the binary encoding to the text editor's native format Upon receiving such a request, therefore, the operating system first calls the appropriate downloading routines from the modules 28 to retrieve the file from the server 24. After receiving the file, the operating system provides it to a decompression module 30 and then to a decryption module 32, to transform it into a non-compressed, binary file. One of the translators 26 is then called, to transform the binary file into the native format of the application program which initially requested the file. At this point, the operating system can store the transformed file on the local storage disk 14, and provide the application program with its address, so that it can be retrieved via the file system 18.

As can be seen, all of the transformations which are necessary to convert the file into the application program's native state are carried out under the control of the operating system, in a manner which is transparent to the application. The operating system determines each of the transformations that need to be applied, and then calls each transformation in sequence to make the appropriate conversions before the file is provided to the calling application. As such, the application program itself need not have any functionality beyond that which is necessary to process files in its native format. Furthermore, it only needs to be able to retrieve files from one type of storage system, yet has access to files on all available sites.

While the foregoing example has been described with reference to the retrieval, or opening, of a file by an application program, the principles of the invention also apply to the storage, i.e. saving, of an object. In this case, the application program issues a call to save a file. In response to this call, the operating system can display a user interface which permits the user to designate the format and location for the saved file. The application itself need only store the file in a location about which it has knowledge, e.g. the local disk 14. The operating system determines the transformations that are needed to transfer the file to the designated location and convert it into the desired format.

These concepts are explained in greater detail with reference to FIG. 2. FIG. 2 is a diagram illustrating a method of the operation of an operating system in accordance with one embodiment of the present invention. In block 40, the application program calls the operating system. A "get file" request is sent to the operating system in block 42. In a preferred embodiment, this call causes a user interface, such as that of block 22a, to be produced. The application program indicates the types of objects that it can operate on, i.e. its "native" object types. This can be done in the "get file" request, or in a prior option setting.

In response, the operating system retrieves a list of objects from a selected site, and causes them to be displayed on the user interface so that the user can select one to be opened. The objects which are displayed include those which are in the native format of the application program. In addition, the operating system determines whether it has the appropriate transformation module, or suite of modules, for converting from any other type of file into the native format of the application. The files of these other types, for which the suitable translators are present, are also displayed on the user interface.

When the user selects an object in block 22b, one or more file transformation programs are called by the operating system to change the location of the object into an object location accessible by the application program, and to change the type of the program into a native object type. The transformation can use a file translation program such as that described in Ashe, et al., U.S. Pat. No. 5,652,876, "Method and Apparatus of Launching Files Created by Non-Resident Application Programs", which is incorporated herein by reference. Further details of a translation manager for calling the appropriate translation program are given in the book, *Inside Macintosh*, volume 11 "The Macintosh Toolbox", Chapter 7, which is incorporated herein by reference.

The operating system calls the translation program and passes the objects and other arguments to cause the objects to be translated in type and to change locations. Other transformations can also be done. The transformed object is transferred to the application program in block 44.

As can be seen, the appropriate transformations are chained to an application-specific operation, such as "Save" or "Open" command. In response to such a command, the operating system can cause one transforming program to transfer the object from a first state into a second state (e.g. change of location), and then cause another program to change the object from the second state into the third state (e.g. change of format). As many different state changes as are appropriate can be carried out in sequence. In this way, the application program can be supplied with a object in its native state from a object in the first state, in response to its call.

In block 44, the transformed object is modified by the application program. When the user desires to store the modified object, the application program sends a "put file" request to the operating system in step 46. A "put file" user interface 46a can be provided to the user. The "put file" user interface displays directories to store the objects as well as indications of the transformations allowed by the operating system, based upon the stored transformation modules. The user can select the type and final location for the modified object from the user interface. The selected location and type of the objects to be stored may be of a type not native to the application program. In this case, opaque control data is created by the operating system in block 46b from the user's input to the "put file" user interface 46a. The opaque control data describes the location and transformation steps required to store the modified object. For example, if the object is to be stored in a database, the opaque data includes the database specific format information for accessing the location where the modified object is to be stored. If the store is to an internet location, the opaque data contains the web address and any required passwords.

The operating system returns a local location and opaque control data to the application program in block 48. The application program in block 48 then stores the modified object and the opaque control data at the local location. Since the opaque data is stored by the application program, the operating system need not independently store this data.

Next, the application program sends a "complete store" request to the operating system in block 50. As an alternative to storing the opaque control data, the application program can return this data to the operating system with the "complete store" request. The operating system in block 50 transforms the object. The type of the object can be changed back to the original object format, or any other format selected by the user, and the location of the object is changed to that designated by the user. This transforming step is done in accordance with the opaque control data associated with the modified object.

The format of the opaque control data is set by the operating system. This format can be modified without modifying the application program, since the application program does not interpret the opaque control data.

The transformation in block 50 need not automatically be done. In block 46, when the user selects a location and object type, the user may wish to store the modified object in another format such as a native object format. In this case, the opaque control data indicates this to the operating system in step 50.

In the present invention, the application program can remain constant, while the types of objects on which the application program can operate is expanded by the operating system. New object type transformations can be added to the computer system transparently to the application program.

In one embodiment, the application program can inhibit the automatic transformation of object types, by setting a flag passed to the operating system. The application program can also set the user interfaces to not display objects that require a transformation by the operating system.

It will be appreciated by those of ordinary skill in the art that the invention can be embodied in other specific forms without departing from the spirit or essential character thereof. For example, while certain specific types of transformations have been described, other transformations are also contemplated by the invention. The presently disclosed embodiments are therefore considered in all respects to be illustrative and not restrictive. The scope of the invention is indicated by the appended claims, rather than the foregoing description, and all changes which come within the meaning and range of equivalence thereof are intended to be embraced therein.

What is claimed is:

1. A method of saving an object that has been operated on by an application program executing on a computer, comprising the steps of:
    calling the computer's operating system from the application program and providing an indication of a state in which the object is to be saved;
    thereafter producing, by the operating system, opaque control data which indicates transformations to be performed on the object to place it in the indicated state, and an indication of a first location;
    writing, by the application program, the object and the opaque control data to the first location;
    after the object and opaque control data is written to the first location, sending, by the application program, a signal to the operating system; and
    transforming, by the operating system, the object into a transformed object after the operating system receives said signal, in accordance with the opaque control data.

2. The method of claim 1, wherein the operating system produces an user interface in response to said call.

3. The method of claim 2, wherein the operating system interprets user input to the user interface to produce the opaque control data.

4. The method of claim 1, wherein the application program does not interpret the opaque control data.

5. The method of claim 1, wherein said transforming step includes performing plural different types of transformations on the object.

6. The method of claim 1, wherein the transformed object is of a type not native to the application program.

7. The method of claim 1, wherein the transformed object is located at locations not native to the application program.

8. The method of claim 1, wherein the transforming step comprises object compression.

9. The method of claim 1, wherein the transforming step comprises object encryption.

10. The method of claim 1, wherein the transforming step comprises authentication of the object.

11. The method of claim 1, further comprising the steps of, before the calling step,
    sending a call to the operating system to open a file and displaying a user interface in response to said call;
    selecting a first object from a list displaying by said user interface; and
    automatically transforming, under control of the operating system, the selected object and providing the object to the application program.

12. A computer-readable medium containing a program which executes the following procedure:
    receiving a put call from an application program separate from said program;
    providing opaque control data which identifies transformations on an object and an indication of a first location to the application program;
    receiving a complete store signal from the application program; and
    transforming an object stored at said first location into a transformed object in accordance with the opaque control data.

13. The computer-readable medium of claim 12, further including the step of producing an user interface in response to the received call.

14. The computer-readable medium of claim 13, further including the step of interpreting user input to the user interface to produce the opaque control data.

15. The computer-readable medium of claim 12, wherein the application program does not interpret the opaque control data.

16. The computer-readable medium of claim 12, wherein plural transformations are performed on the object in response to said call.

17. The computer-readable medium of claim 12, wherein the transformed object is of a type not native to the application program.

18. The computer-readable medium of claim 12, wherein the transformed object is located at locations not native to the application program.

19. The computer-readable medium of claim 12, wherein the transforming step comprises object compression.

20. The computer-readable medium of claim 12, wherein the transforming step comprises object encryption.

21. The computer-readable medium of claim 12, wherein the transforming step comprises authentication of the object.

* * * * *